(12) United States Patent
Takahashi et al.

(10) Patent No.: US 10,356,260 B1
(45) Date of Patent: Jul. 16, 2019

(54) MEDIUM CONVEYANCE DEVICE AND DETERMINATION METHOD

(71) Applicant: PFU LIMITED, Ishikawa (JP)

(72) Inventors: Masayasu Takahashi, Ishikawa (JP); Yoshiaki Yamahara, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 16/030,834

(22) Filed: Jul. 9, 2018

(30) Foreign Application Priority Data

Mar. 20, 2018 (JP) .................................. 2018-051976

(51) Int. Cl.
*H04N 1/00* (2006.01)

(52) U.S. Cl.
CPC ..... *H04N 1/00551* (2013.01); *H04N 1/00779* (2013.01)

(58) Field of Classification Search
CPC ........ H04N 1/1235; H04N 1/121; B65H 7/14; B65H 7/02
See application file for complete search history.

(56) References Cited

U.S. PATENT DOCUMENTS

| 9,929,763 | B1* | 3/2018 | Zheng | H04B 1/3838 |
|---|---|---|---|---|
| 2010/0171027 | A1* | 7/2010 | Yun | H03K 17/941 250/221 |
| 2014/0306553 | A1* | 10/2014 | Lee | G06F 1/3231 307/326 |
| 2015/0362860 | A1* | 12/2015 | Anderson | G03G 15/0865 399/272 |

FOREIGN PATENT DOCUMENTS

| JP | H07-323940 A | 12/1995 |
| JP | 2011-068448 A | 4/2011 |
| JP | 2011068448 A * | 4/2011 |

* cited by examiner

*Primary Examiner* — Ted W Barnes
(74) *Attorney, Agent, or Firm* — McDermott Will & Emery LLP

(57) ABSTRACT

A medium conveyance device includes an openable and closable cover that covers a conveyance path for a medium, a sensor that includes a transmission unit which transmits a measured object and a reception unit which receives the measured object transmitted from the transmission unit, the sensor for detection of the medium being present on the conveyance path, and a processor that increases a transmission level of the transmission unit when a reception level for the measured object received by the reception unit is less than a threshold, and determines whether the cover is opened based on whether a rate of change of the reception level between before and after an increase in the transmission level is less than a threshold.

8 Claims, 6 Drawing Sheets

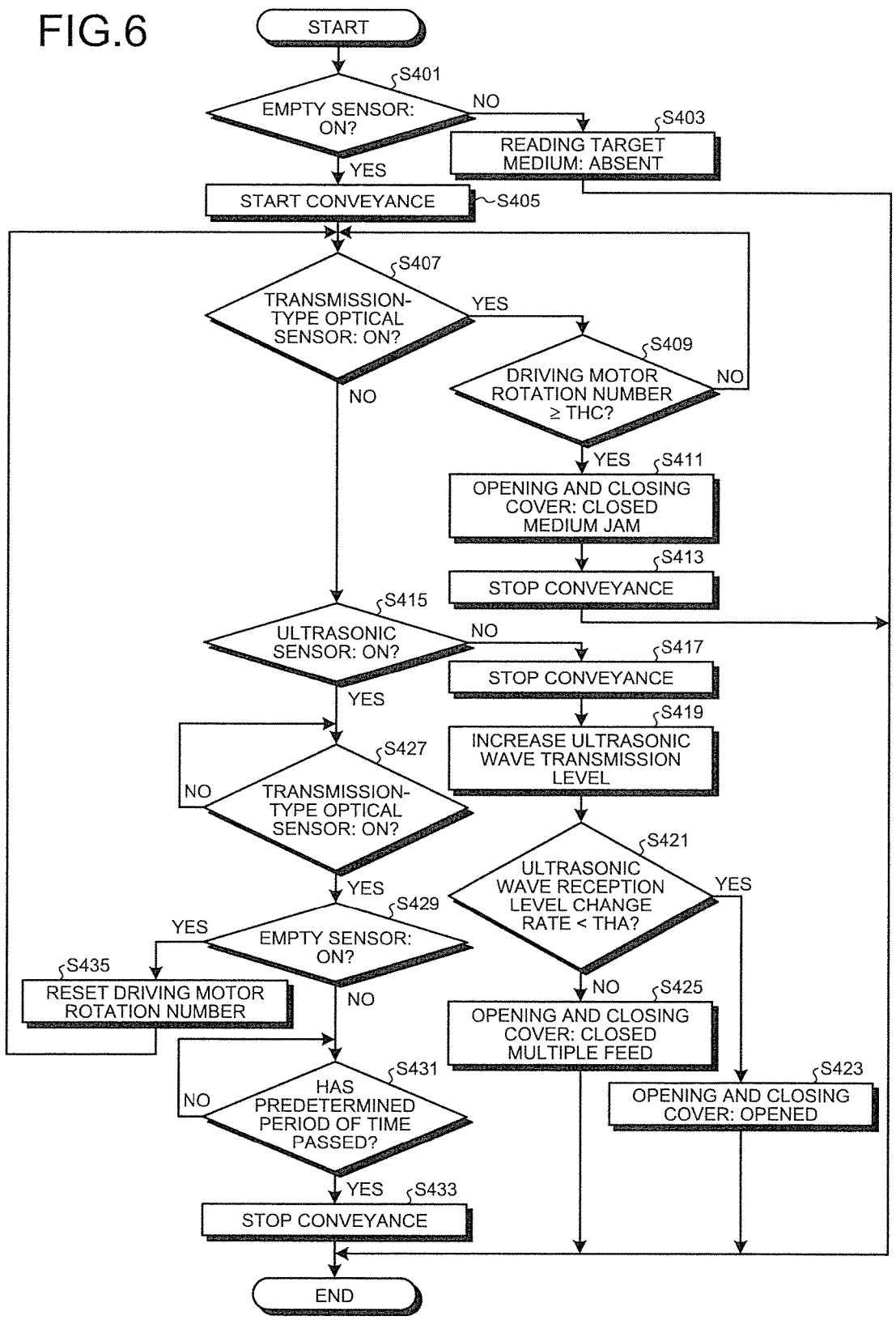

MEDIUM CONVEYANCE DEVICE AND DETERMINATION METHOD

CROSS-REFERENCE TO RELATED APPLICATION

The present application claims priority to and incorporates by reference the entire contents of Japanese Patent Application No. 2018-051976 filed in Japan on Mar. 20, 2018.

FIELD

The present disclosure relates to a medium conveyance device and a determination method.

BACKGROUND

There is a scanner apparatus with an upper cover that is openable and closable for maintenance of the scanner apparatus or the like. Conventionally, a scanner apparatus is provided with a dedicated sensor for detecting an opened or closed state of an openable and closeable cover (that may be called an "opening and closing cover" below). Examples of related-art are described in JP-A-2011-068448, and in JP-A-7-323940.

To provide a dedicated sensor for detection of an opened or closed state of an opening and closing cover contributes to an increase in a manufacturing cost of a scanner apparatus.

SUMMARY

According to an aspect of an embodiment, a medium conveyance device includes an openable and closable cover that covers a conveyance path for a medium, a sensor that includes a transmission unit which transmits a measured object and a reception unit which receives the measured object transmitted from the transmission unit, the sensor for detection of the medium being present on the conveyance path, and a processor that increases a transmission level of the transmission unit when a reception level for the measured object received by the reception unit is less than a threshold, and determines whether the cover is opened based on whether a rate of change of the reception level between before and after an increase in the transmission level is less than a threshold.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

BRIEF DESCRIPTION OF DRAWINGS

FIG. 6 is a flowchart of a process example of a medium conveyance device according to a fourth embodiment.

DESCRIPTION OF EMBODIMENTS

Preferred embodiments of the present disclosure will be explained with reference to accompanying drawings. An identical configuration and a step for executing an identical process in the embodiments are provided with identical signs.

First Embodiment

Configuration of Scanner Apparatus

Figure 1:
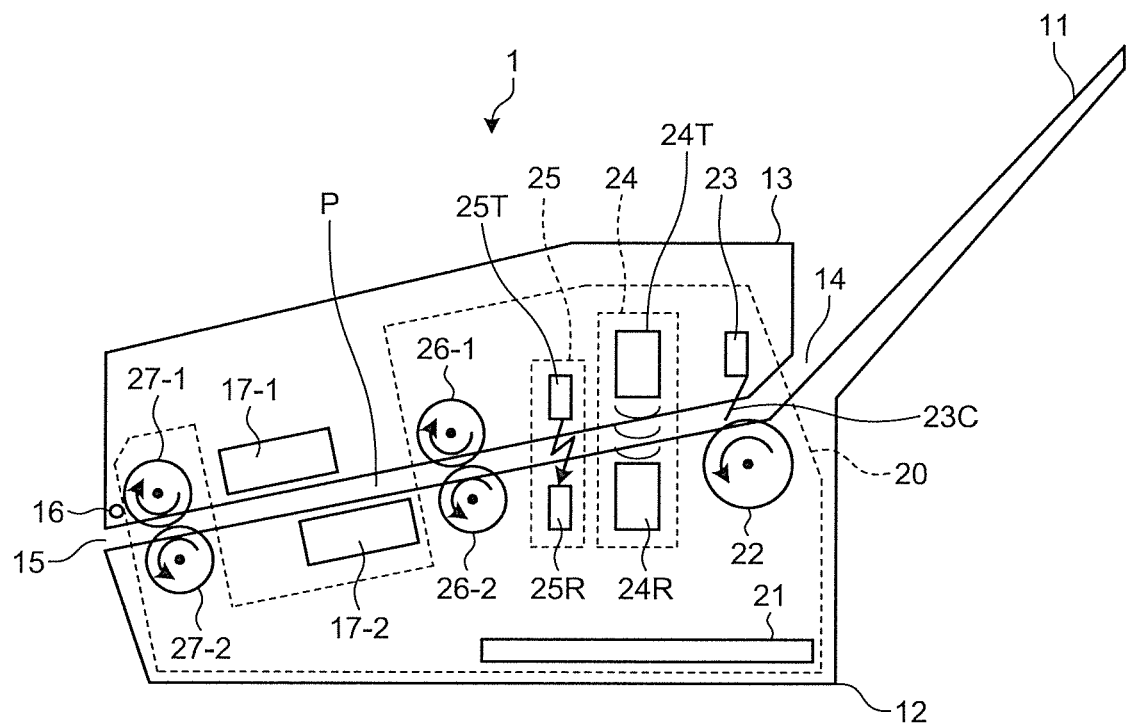
FIG. 1 is a diagram of a configuration example of a scanner apparatus according to a first embodiment.
Figure 2:
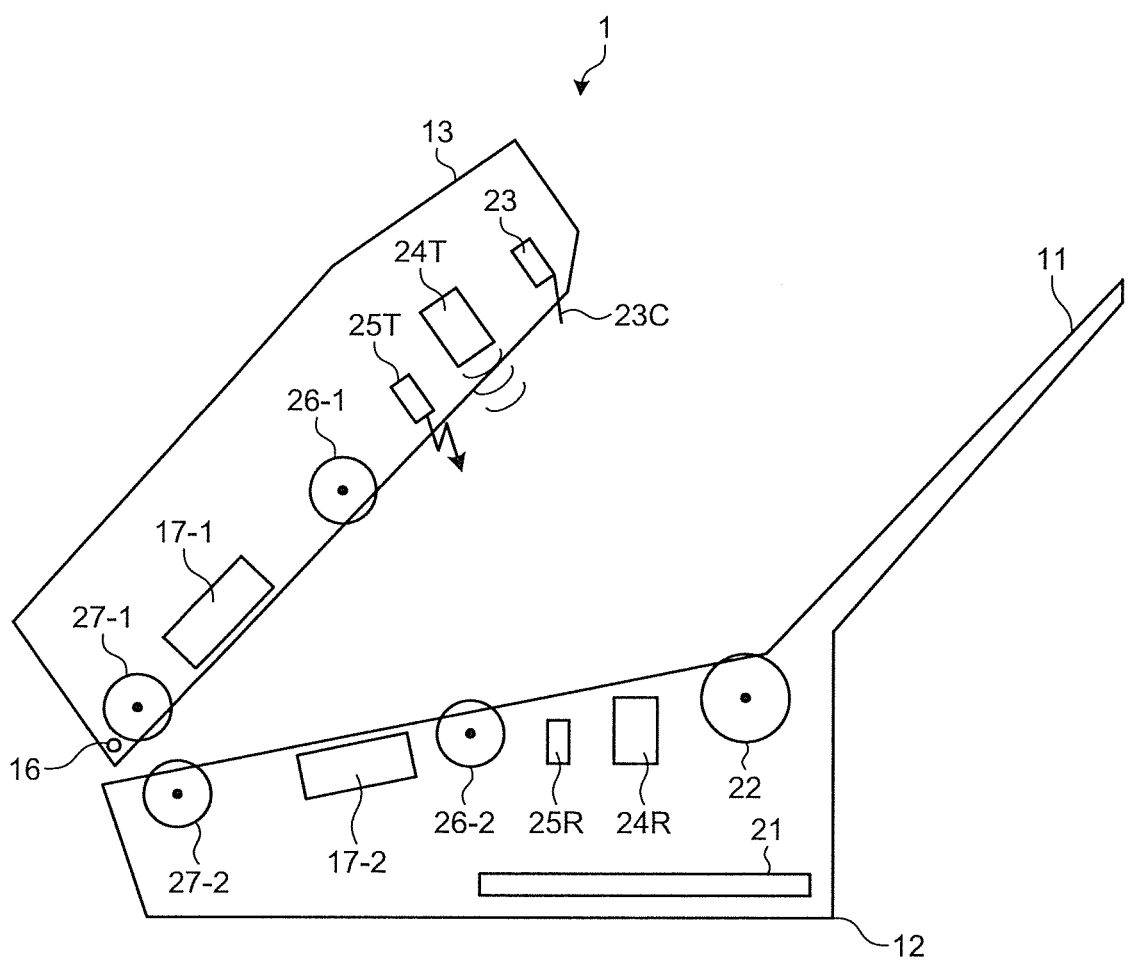
FIG. 2 is a diagram of a configuration example of a scanner apparatus according to the first embodiment.

FIG. 1 and FIG. 2 are diagrams of a configuration example of a scanner apparatus according to a first embodiment. FIG. 1 depicts a state where an opening and closing cover 13 is closed and FIG. 2 depicts a state where the opening and closing cover 13 is opened. For an example of a medium that is a target of reading by a scanner apparatus 1 (that may be called a "reading target medium" below), an original document where a character or a figure is described therein is provided.

In FIG. 1 and FIG. 2, the scanner apparatus 1 includes a shooter 11, a lower housing 12, the opening and closing cover 13 as an upper housing, a medium insertion port 14, a medium discharge port 15, a rotary shaft 16, medium reading units 17-1, 17-2, a medium conveyance device 20, and a conveyance path P.

The medium conveyance device 20 includes a control unit 21, a pick roller 22, an empty sensor 23, an ultrasonic sensor 24, a transmission-type optical sensor 25, conveyance rollers 26-1, 26-2, and discharge rollers 27-1, 27-2. The ultrasonic sensor 24 includes a wave transmitter 24T and a wave receiver 24R. The wave transmitter 24T and the wave receiver 24R are arranged to face each other. The transmission-type optical sensor 25 includes a light transmitter 25T and a light receiver 25R. The light transmitter 25T and the light receiver 25R are arranged to face each other.

The lower housing 12 contains the control unit 21, the pick roller 22, the wave receiver 24R, the light receiver 25R, the conveyance roller 26-2, the medium reading unit 17-2, and the discharge roller 27-2.

The opening and closing cover 13 contains the empty sensor 23, the wave transmitter 24T, the light transmitter 25T, the conveyance roller 26-1, the medium reading unit 17-1, and the discharge roller 27-1.

As depicted in FIG. 1 and FIG. 2, the opening and closing cover 13 is openable and closable, centered around the rotary shaft 16. As depicted in FIG. 1, the conveyance path p for conveying a reading target medium is formed between the opening and closing cover 13 and the lower housing 12, and the opening and closing cover 13 covers the conveyance path P in a state where the opening and closing cover 13 is closed (FIG. 1).

The empty sensor 23 has a contact 23C. The empty sensor 23 is turned on when a reading target medium contacts the contact 23C while being turned off when the reading target medium does not contact the contact 23C.

In the ultrasonic sensor 24, the wave receiver 24R receives an ultrasonic wave that is transmitted from the wave transmitter 24T. The ultrasonic sensor 24 is turned on when a reception level of an ultrasonic wave that is received by the wave receiver 24R (that may be called an "ultrasonic wave reception level" below) is greater than or equal to a threshold TH1 while the ultrasonic sensor 24 is turned off when such an ultrasonic wave reception level is less than the threshold TH1. A measured object in the ultrasonic sensor 24 is an ultrasonic wave. In the ultrasonic sensor 24, the wave transmitter 24T corresponds to a transmission unit of the ultrasonic sensor 24 and the wave receiver 24R corresponds to a reception unit of the ultrasonic sensor 24.

When a reading target medium is not present between the wave transmitter 24T and the wave receiver 24R in a state where the opening and closing cover 13 is closed, an ultrasonic wave reception level is greater than or equal to the threshold TH1 so that the ultrasonic sensor 24 is turned on. When one reading target medium is present between the wave transmitter 24T and the wave receiver 24R in a state where the opening and closing cover 13 is closed, an ultrasonic wave reception level is greater than or equal to the threshold TH1 so that the ultrasonic sensor 24 is turned on. When two or more reading target media are present between the wave transmitter 24T and the wave receiver 24R in a state where the opening and closing cover 13 is closed, an ultrasonic wave reception level is less than the threshold TH1 so that the ultrasonic sensor 24 is turned off. When the opening and closing cover 13 is opened, an ultrasonic wave reception level is less than the threshold TH1 so that the ultrasonic sensor 24 is turned off.

In the transmission-type optical sensor 25, the light receiver 25R receives (light-receives) light that is transmitted (projected) from the light transmitter 25T. The transmission-type optical sensor 25 is turned on when a reception level of light that is received by the light receiver 25R (that may be called a "light reception level" below) is greater than or equal to a threshold TH2, while the transmission-type optical sensor 25 is turned off when such a light reception level is less than the threshold TH2. A measured object in the transmission-type optical sensor 25 is light. For an example of light that is a measured object in the transmission-type optical sensor 25, infrared radiation or laser light is provided. In the transmission-type optical sensor 25, the light transmitter 25T corresponds to a transmission unit of the transmission-type optical sensor 25 and the light receiver 25R corresponds to a reception unit of the transmission-type optical sensor 25.

When a reading target medium is not present between the light transmitter 25T and the light receiver 25R in a state where the opening and closing cover 13 is closed, a light reception level is greater than or equal to the threshold TH2 so that the transmission-type optical sensor 25 is turned on. When one reading target medium is present between the light transmitter 25T and the light receiver 25R in a state where the opening and closing cover 13 is closed, a light reception level is less than the threshold TH2 so that the transmission-type optical sensor 25 is turned off. When the opening and closing cover 13 is opened, a light reception level is less than the threshold TH2 so that the transmission-type optical sensor 25 is turned off.

For an example of application of the ultrasonic sensor 24, detecting occurrence of a multiple feed (multi-feed) of a reading target medium that is present on the conveyance path P is provided. For an example of application of the transmission-type optical sensor 25, detecting occurrence of a jam of a reading target medium that is present on the conveyance path P (that may be called a "medium jam" below) is provided. That is, the ultrasonic sensor 24 and the transmission-type optical sensor 25 are sensors for detection of a reading target medium that is present on the conveyance path P. When a multiple feed or a medium jam of a reading target medium occurs, the control unit 21 informs that a multiple feed or a medium jam occurs, by display on a display, an alarm sound, or the like, and hence, an operator of the scanner apparatus 1 is allowed to open the opening and closing cover 13 and thereby eliminate a reading target medium from the conveyance path P.

In FIG. 1, when a reading target medium that is placed on the shooter 11 and inserted into the conveyance path P through the medium insertion port 14 contacts the contact 23C of the empty sensor 23, the empty sensor 23 is turned on. When the empty sensor 23 is turned on, the control unit 21 starts rotation of the pick roller 22, the conveyance rollers 26-1, 26-2, and the discharge rollers 27-1, 27-2, so that conveyance of a reading target medium on the conveyance path P is started. The pick roller 22, the conveyance roller 26-2, and the discharge roller 27-2 rotate leftward (counter-clockwise) while the conveyance roller 26-1 and the discharge roller 27-1 rotate rightward (clockwise).

The medium reading units 17-1, 17-2 read a reading target medium that passes between the conveyance roller 26-1 and the conveyance roller 26-2, with conveyance thereof. The medium reading unit 17-1 reads an upper surface of a reading target medium and the medium reading unit 17-2 reads a lower surface of the reading target medium.

A reading target medium with its reading being executed subsequently passes between the discharge roller 27-1 and the discharge roller 27-2 and is discharged through the medium discharge port 15.

Process of Medium Conveyance Device 20

Figure 3:
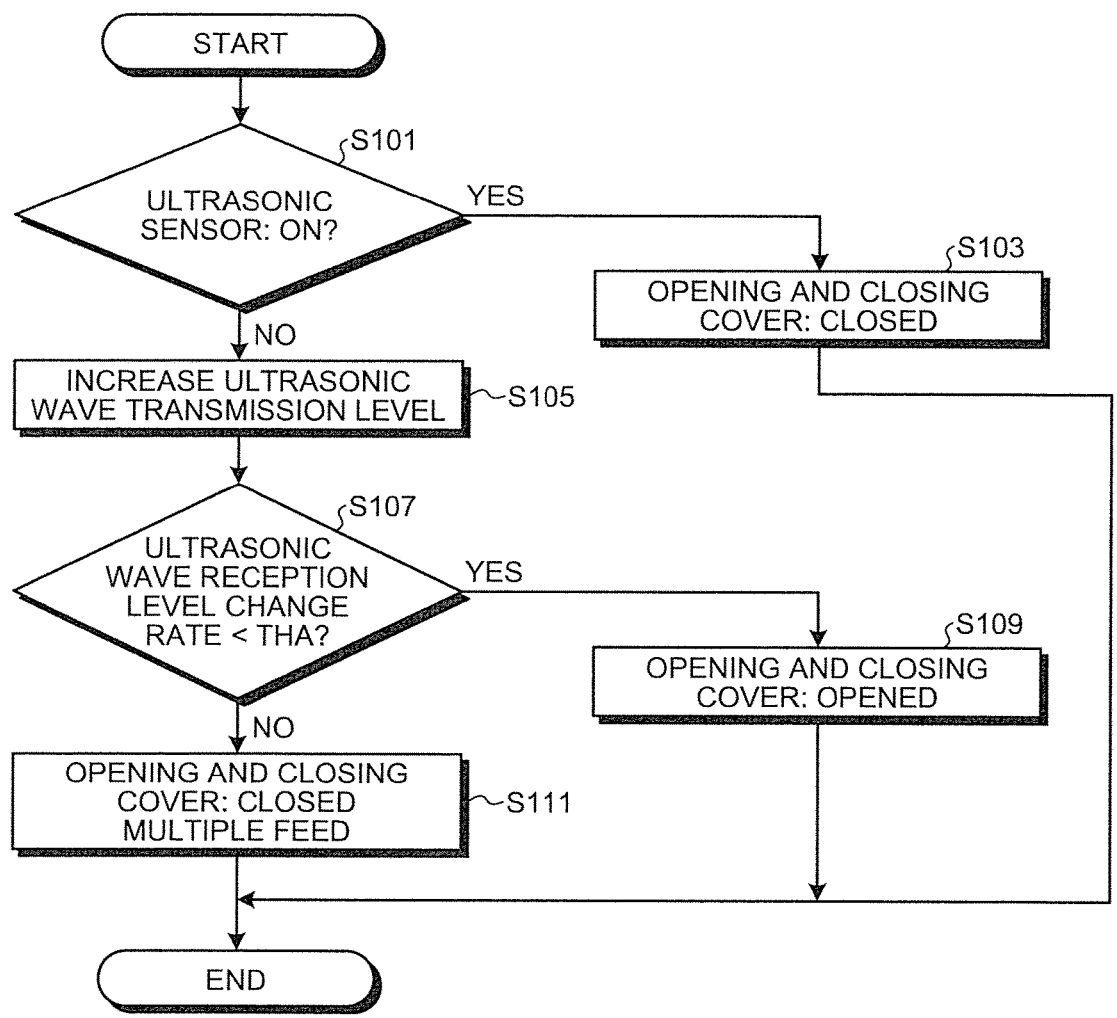
FIG. 3 is a flowchart of a process example of a medium conveyance device according to the first embodiment.

FIG. 3 is a flowchart of a process example of a medium conveyance device according to the first embodiment. A flowchart of FIG. 3 starts at predetermined timing in a state where the scanner apparatus 1 is powered on.

In FIG. 3, at step S101, the control unit 21 determines whether the ultrasonic sensor 24 is turned on.

When the ultrasonic sensor 24 is turned on (step S101: Yes), the control unit 21 determines that the opening and closing cover 13 is closed (step S103).

On the other hand, when the ultrasonic sensor 24 is turned off (step S101: No), the control unit 21 increases a transmission level of an ultrasonic wave that is transmitted from the wave transmitter 24T of the ultrasonic sensor 24 (that may be called an "ultrasonic wave transmission level" below) (step S105). The control unit 21 increases an ultrasonic wave transmission level by, for example, an increase in the number of oscillations per unit time or an increase in an oscillation voltage for an ultrasonic wave.

At step S107, the control unit 21 determines whether a rate of change of an ultrasonic wave reception level between before and after an increase in an ultrasonic wave transmission level (that may be called an "ultrasonic wave reception level change rate" below) is less than a threshold THA.

When an ultrasonic wave reception level change rate is less than the threshold THA (step S107: Yes), the control unit 21 determines that the opening and closing cover 13 is opened (step S109).

On the other hand, when an ultrasonic wave reception level change rate is greater than or equal to the threshold THA (step S107: No), the control unit 21 determines that the opening and closing cover 13 is closed and a multiple feed of a reading target medium that is present on the conveyance path P occurs (step S111).

After the processing at step S103, S109, or step S111, the process is ended.

When a process is executed according to a flowchart as depicted in FIG. 3, the medium conveyance device 20 does not have to include the transmission-type optical sensor 25.

The first embodiment has been explained above.

Second Embodiment

Process of Medium Conveyance Device 20

Figure 4:
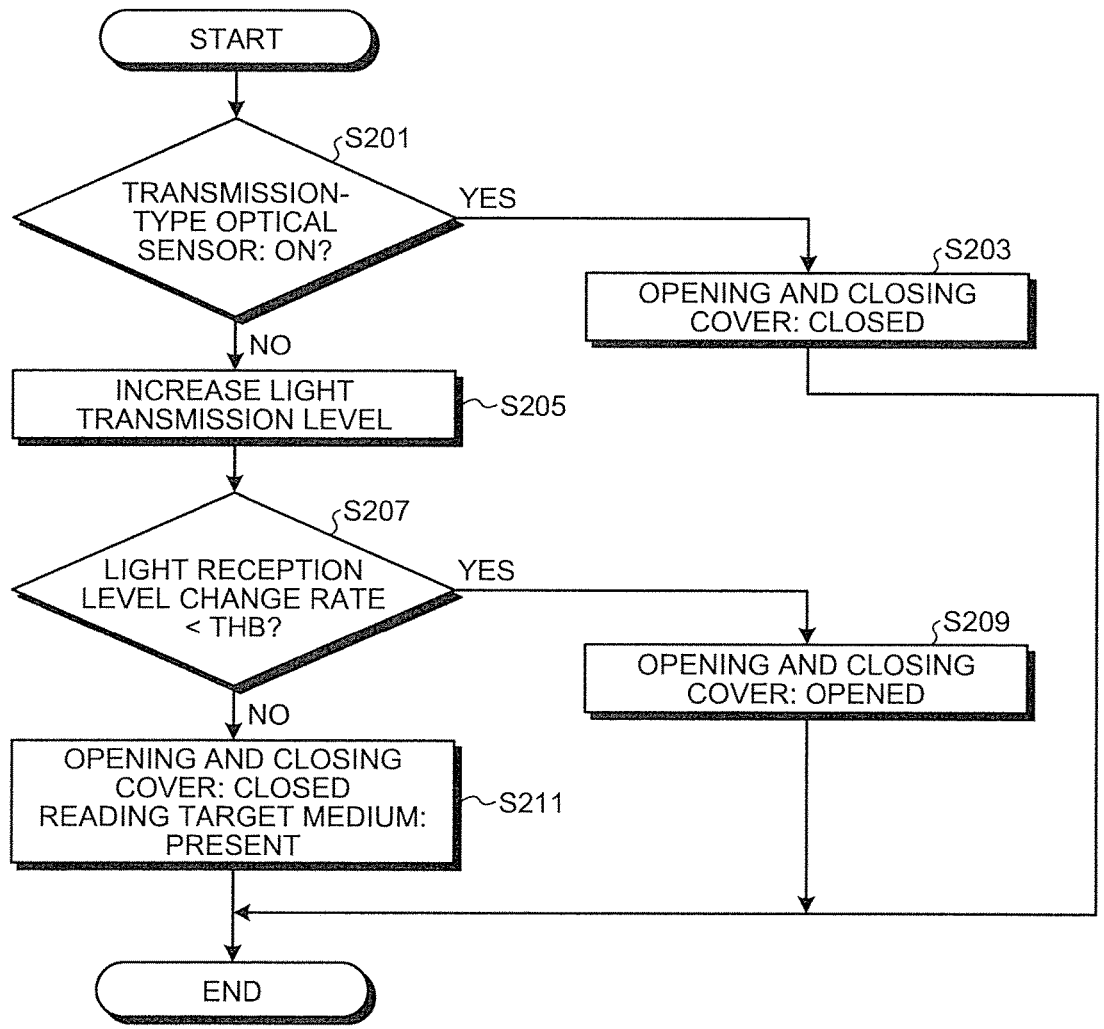
FIG. 4 is a flowchart of a process example of a medium conveyance device according to a second embodiment.

FIG. 4 is a flowchart of a process example of a medium conveyance device according to a second embodiment. A flowchart of FIG. 4 starts at predetermined timing in a state where the scanner apparatus 1 is powered on.

In FIG. 4, at step S201, the control unit 21 determines whether the transmission-type optical sensor 25 is turned on.

When the transmission-type optical sensor 25 is turned on (step S201: Yes), the control unit 21 determines that the opening and closing cover 13 is closed (step S203).

On the other hand, when the transmission-type optical sensor 25 is turned off (step S201: No), the control unit 21 increases a transmission level of light that is transmitted from the light transmitter 25T of the transmission-type optical sensor 25 (that may be called a "light transmission level" below) (step S205). The control unit 21 increases an amount of light by, for example, an increase in a light emission current value in the light transmitter 25T, and thereby, increases a light transmission level.

At step S207, the control unit 21 determines whether a rate of change of a light reception level between before and after an increase in a light transmission level (that may be called a "light reception level change rate" below) is less than a threshold THB.

When a light reception level change rate is less than the threshold THB (step S207: Yes), the control unit 21 determines that the opening and closing cover 13 is opened (step S209).

On the other hand, when a light reception level change rate is greater than or equal to the threshold THB (step S207: No), the control unit 21 determines that the opening and closing cover 13 is closed and a reading target medium that is normally conveyed on the conveyance path P (that is, one reading target medium) is present (step S211).

After the processing at step S203, S209, or step S211, the process is ended.

When a process is executed according to a flowchart as depicted in FIG. 4, the medium conveyance device 20 does not have to include the ultrasonic sensor 24.

The second embodiment has been explained above.

Third Embodiment

Process of Medium Conveyance Device 20

Figure 5:
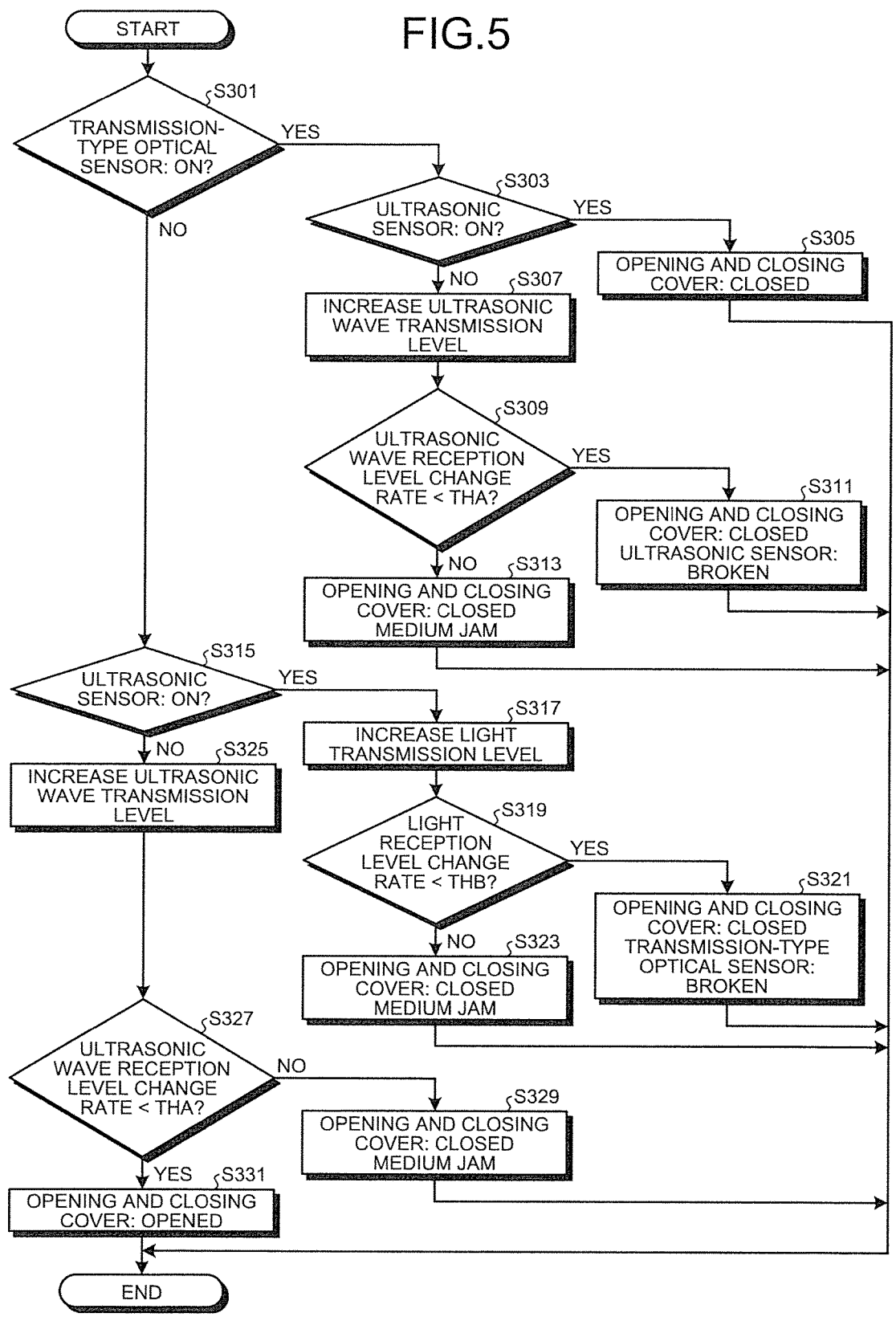
FIG. 5 is a flowchart of a process example of a medium conveyance device according to a third embodiment.

FIG. 5 is a flowchart of a process example of a medium conveyance device according to a third embodiment. A flowchart of FIG. 5 starts in a "standby state" of the medium conveyance device 20 at regular intervals. A "standby state" of the medium conveyance device 20 is, for example, a state after the scanner apparatus 1 is powered on and before a scan start button (depiction omitted) that is included in the scanner apparatus 1 is pushed. A "standby state" of the medium conveyance device 20 is, for example, is a state after the scanner apparatus 1 is powered on and before the scanner apparatus 1 receives a scan start instruction that is issued from an exterior of the scanner apparatus 1.

In FIG. 5, at step S301, the control unit 21 determines whether the transmission-type optical sensor 25 is turned on. When the transmission-type optical sensor 25 is turned on (step S301: Yes), the process is shifted to step S303, and when the transmission-type optical sensor 25 is turned off (step S301: No), the process is shifted to step S315.

At step S303, the control unit 21 determines whether the ultrasonic sensor 24 is turned on.

When the ultrasonic sensor 24 is turned on at step S303 (step S303: Yes), the control unit 21 determines that the opening and closing cover 13 is closed (step S305).

On the other hand, when the ultrasonic sensor 24 is turned off at step S303 (step S303: No), the control unit 21 determines that an ultrasonic wave transmission level is increased (step S307).

At step S309, the control unit 21 determines whether an ultrasonic wave reception level change rate is less than a threshold THA.

When an ultrasonic wave reception level change rate is less than the threshold THA at step S309 (step S309: Yes), the control unit 21 determines that the opening and closing cover 13 is closed and the ultrasonic sensor 24 is broken (step S311).

On the other hand, when an ultrasonic wave reception level change rate is greater than or equal to the threshold THA at step S309 (step S309: No), the control unit 21 determines that the opening and closing cover 13 is closed and a medium jam occurs (step S313).

At step S315, the control unit 21 determines whether the ultrasonic sensor 24 is turned on. When the ultrasonic sensor 24 is turned on at step S315 (step S315: Yes), the process is shifted to step S317, and when the ultrasonic sensor 24 is turned off at step S315 (step S315: No), the process is shifted to step S325.

At step S317, the control unit 21 increases a light transmission level.

At step S319, the control unit 21 determines whether a light reception level change rate is less than a threshold THB.

When a light reception level change rate is less than the threshold THB at step S319 (step S319: Yes), the control unit 21 determines that the opening and closing cover 13 is closed and the transmission-type optical sensor 25 is broken (step S321).

On the other hand, when a light reception level change rate is greater than or equal to the threshold THB at step S319 (step S319: No), the control unit 21 determines that the opening and closing cover 13 is closed and a medium jam occurs (step S323).

At step S325, the control unit 21 increases an ultrasonic wave transmission level.

At step S327, the control unit 21 determines whether an ultrasonic wave reception level change rate is less than the threshold THA.

When an ultrasonic wave reception level change rate is greater than or equal to the threshold THA at step S327 (step S327: Yes), the control unit 21 determines that the opening and closing cover 13 is closed and a medium jam occurs (step S329).

On the other hand, when an ultrasonic wave reception level change rate is less than the threshold THA at step S327 (step S327: Yes), the control unit 21 determines that the opening and closing cover 13 is opened (step S331).

After the processing at step S305, S311, S313, S321, S323, S329, or step S331, the process is ended.

The third embodiment has been explained above.

Fourth Embodiment

Process of Medium Conveyance Device 20

FIG. 6 is a flowchart of a process example of a medium conveyance device according to a fourth embodiment. A flowchart of FIG. 6 starts when an operation start instruction is provided to the medium conveyance device 20. For example, when the scanner apparatus 1 is powered on and subsequently a scan start button (depiction omitted) that is included in the scanner apparatus 1 is pushed, an operation start instruction is provided to the medium conveyance device 20. For example, when the scanner apparatus 1 is powered on and subsequently the scanner apparatus 1 receives a scan start instruction that is issued from an exterior of the scanner apparatus 1, an operation start instruction is provided to the medium conveyance device 20.

In FIG. 6, at step S401, the control unit 21 determines whether the empty sensor 23 is turned on.

When the empty sensor 23 is turned off at step S401 (step S401: No), the control unit 21 determines that a reading target medium is not present on the shooter 11 (step S403).

On the other hand, when the empty sensor 23 is turned on at step S401 (step S401: Yes), the control unit 21 starts rotation of a motor that drives the pick roller 22, the conveyance rollers 26-1, 26-2, and the discharge rollers 27-1, 27-2 (that may be called a "driving motor" below) (depiction omitted) to start conveyance of a reading target medium (step S405).

At step S407, the control unit 21 determines whether the transmission-type optical sensor 25 is turned on. When the transmission-type optical sensor 25 is turned on at step S407 (step S407: Yes), the process is shifted to step S409, and when the transmission-type optical sensor 25 is turned off at step S407 (step S407: No), the process is shifted to step S415.

At step S409, the control unit 21 determines whether the number of rotations of the driving motor from a point of time of a start of conveyance at step S405 (that may be called a "driving motor rotation number" below) is greater than or equal to a threshold THC.

The pick roller 22, the conveyance rollers 26-1, 26-2, and the discharge rollers 27-1, 27-2 rotate according to rotation of the driving motor. The pick roller 22, the conveyance rollers 26-1, 26-2, and the discharge rollers 27-1, 27-2 rotate to convey a reading target medium on the conveyance path P. The threshold THC is set depending on a distance between the empty sensor 23 and the transmission-type optical sensor 25 and the threshold THC is preliminarily set for the control unit 21 in such a manner that a driving motor rotation number reaches the threshold THC at a point of time when a front end of a reading target medium that travels on the conveyance path P reaches the transmission-type optical sensor 25.

As long as a driving motor rotation number is less than the threshold THC (step S409: No), the process is returned to step S407. On the other hand, when a driving motor rotation number is greater than or equal to the threshold THC (step S409: Yes), the control unit 21 determines that the opening and closing cover 13 is closed and a medium jam occurs (step S411), and stops rotation of the driving motor to stop conveyance of a reading target medium (step S413).

At step S415, the control unit 21 determines whether the ultrasonic sensor 24 is turned on. When the ultrasonic sensor 24 is turned on (step S415: Yes), the process is shifted to step S427, and when the ultrasonic sensor 24 is turned off (step S415: No), the process is shifted to step S417.

At step S417, the control unit 21 stops rotation of the driving motor to stop conveyance of a reading target medium.

At step S419, the control unit 21 increases an ultrasonic wave transmission level.

At step S421, the control unit 21 determines whether an ultrasonic wave reception level change rate is less than a threshold THA.

When an ultrasonic wave reception level change rate is less than the threshold THA (step S421: Yes), the control unit 21 determines that the opening and closing cover 13 is opened (step S423).

On the other hand, when an ultrasonic wave reception level change rate is greater than or equal to the threshold THA (step S421: No), the control unit 21 determines that the opening and closing cover 13 is closed and a multiple feed of a reading target medium that is present on the conveyance path P occurs (step S425).

At step S427, the control unit 21 determines whether the transmission-type optical sensor 25 is turned on.

As long as the transmission-type optical sensor 25 is turned off at step S427, a reading target medium that is conveyed on the conveyance path P passes through the transmission-type optical sensor 25, and hence, when the transmission-type optical sensor 25 is turned off at step S427 (step S427: No), the processing at step S427 is repeated.

When a back end of a reading target medium that is conveyed on the conveyance path P passes through the transmission-type optical sensor 25, the transmission-type optical sensor 25 is turned on, and hence, when the transmission-type optical sensor 25 is turned on at step S427 (step S427: Yes), the control unit 21 determines whether the empty sensor 23 is turned on (step S429).

When the empty sensor 23 is turned on at step S429 (step S429: Yes), a state is provided where a reading target medium still remains on the shooter 11, and hence, the control unit 21 resets a driving motor rotation number to zero, and subsequently, starts counting of such a driving motor rotation number newly (step S435), so that the process is returned to step S407.

On the other hand, when the empty sensor 23 is turned off at step S429 (step S429: No), a state is provided where a reading target medium does not remain on the shooter 11, and hence, the control unit 21 determines whether a predetermined period of time has passed since a point of time of step S429 (step S431). The control unit 21 waits until a predetermined period of time has passed since a point of time of step S429 (step S431: No).

When a predetermined period of time has passed since a point of time of step S429 (step S431: Yes), the control unit 21 stops rotation of the driving motor to stop conveyance of a reading target medium and thereby ends an operation of the medium conveyance device 20 (step S433).

After the processing at step S403, S413, S423, S425, or step S433, the process is ended.

The fourth embodiment has been explained above.

As described above, in the first to fourth embodiments, the medium conveyance device 20 includes the opening and closing cover 13, the ultrasonic sensor 24, the transmission-type optical sensor 25, and the control unit 21. The opening and closing cover 13 covers the conveyance path P for a reading target medium. The ultrasonic sensor 24 includes the wave transmitter 24T that transmits an ultrasonic wave as a measured object and the wave receiver 24R that receives the ultrasonic wave that is transmitted from the wave transmitter 24T. The transmission-type optical sensor 25 includes the light transmitter 25T that transmits light as a measured object and the light receiver 25R that receives light that is transmitted from the light transmitter 25T. Each of the ultrasonic sensor 24 and the transmission-type optical sensor 25 is a sensor for detection of a reading target medium that is present on the conveyance path P.

In the second embodiment, when a light reception level is less than the threshold TH2 (step S201: No), the control unit 21 increases a light transmission level (step S205) and determines whether the opening and closing cover 13 is opened (step S209 or S211) based on whether a light reception level change rate is less than the threshold THB (step S207).

Thereby, it is also possible to serve the transmission-type optical sensor 25 that is a sensor for detection of a reading target medium as that for detection of an opening or closing state of the opening and closing cover 13, and hence, a dedicated sensor for detection of an opening or closing state of the opening and closing cover 13 is not needed, so that it is possible to reduce a manufacturing cost for the medium conveyance device 20 and the scanner apparatus 1.

In the first, third, and fourth embodiments, when an ultrasonic wave reception level is less than the threshold TH1 (step S101, S315, or S415: No), the control unit 21 increases an ultrasonic wave transmission level (step S105, S325, or S419) and determines whether the opening and closing cover 13 is opened (step S109, S111, S331, S329, S423, or S425) based on whether an ultrasonic wave reception level change rate is less than the threshold THA (step S107, S327, or S421).

Thus, similarly to the first embodiment, it is also possible to serve the ultrasonic sensor 24 that is a sensor for detection of a reading target medium as that for detection of an opening or closing state of the opening and closing cover 13, and hence, a dedicated sensor for detection of an opening or closing state of the opening and closing cover 13 is not needed, so that it is possible to reduce a manufacturing cost for the medium conveyance device 20 and the scanner apparatus 1. Detection accuracy of the ultrasonic sensor 24 is generally better than that of the transmission-type optical sensor 25, and hence, it is possible to improve accuracy of detection of an opening or closing state of the opening and closing cover 13 by using the ultrasonic sensor 24 for detection of an opening or closing state of the opening and closing cover 13.

In the second embodiment, the control unit 21 determines that the opening and closing cover 13 is opened (step S209) when a light reception level change rate is less than the threshold THB (step S207: Yes) and determines that a reading target medium is present on the conveyance path P (step S211) when a light reception level change rate is greater than or equal to the threshold THB (step S207: No).

Thereby, it is possible to correctly determine opening of the opening and closing cover 13 and presence of a reading target medium on the conveyance path P.

In the third and fourth embodiments, the control unit 21 increases an ultrasonic wave transmission level (step S325 or S419) when an ultrasonic wave reception level is less than the threshold TH1 (step S315 or S415: No) and determines that the opening and closing cover 13 is opened (step S331 or S423) when a light reception level is less than the threshold TH2 (step S301 or S407: No) and an ultrasonic wave reception level change rate is less than the threshold THA (step S327 or S421: Yes).

Thus, detection of an opening or closing state of the opening and closing cover 13 is executed by using both the ultrasonic sensor 24 and the transmission-type optical sensor 25, so that it is possible to improve detection accuracy as compared with a case where detection of an opening or closing state of the opening and closing cover 13 is executed by using one of the ultrasonic sensor 24 and the transmission-type optical sensor 25. Detection accuracy of the ultrasonic sensor 24 is generally better than that of the transmission-type optical sensor 25, and hence, it is possible to further improve such detection accuracy by using an ultrasonic wave reception level change rate for detection of an opening or closing state of the opening and closing cover 13.

In the third embodiment, in a standby state of the medium conveyance device 20, the control unit 21 determines that the ultrasonic sensor 24 is broken (step S311) when a light reception level is greater than or equal to the threshold TH2 (step S301: Yes) and an ultrasonic wave reception level change rate is less than the threshold THA (step S309: Yes) and determines that a medium jam occurs (step S313) when a light reception level is greater than or equal to the threshold TH2 (step S301: Yes) and an ultrasonic wave reception level change rate is greater than or equal to the threshold THA (step S309: No).

In the third embodiment, in a standby state of the medium conveyance device 20, the control unit 21 determines that the transmission-type optical sensor 25 is broken (step S321) when an ultrasonic wave reception level is greater than or equal to the threshold TH1 (step S315: Yes) and a light reception level change rate is less than the threshold THB (step S319: Yes) and determines that a medium jam occurs (step S323) when an ultrasonic wave reception level is greater than or equal to the threshold TH1 (step S315: Yes) and a light reception level change rate is greater than or equal to the threshold THB (step S319: No).

Thereby, it is possible to correctly determine breakage of the ultrasonic sensor 24 or breakage of the transmission-type optical sensor 25 and a medium jam.

In the third embodiment, in a standby state of the medium conveyance device 20, the control unit 21 determines that a medium jam occurs (step S329) when a light reception level is less than the threshold TH2 (step S301: No) and an ultrasonic wave reception level change rate is greater than or equal to the threshold THA (step S327: No).

Thereby, it is possible to correctly detect that a medium jam occurs in a standby state.

In the fourth embodiment, after an operation start instruction is provided to the medium conveyance device 20, the control unit 21 determines that a multiple feed of a reading target medium occurs (step S425) when an ultrasonic wave reception level change rate is greater than or equal to the threshold THA (step S421: No).

Thereby, it is possible to correctly detect occurrence of a multiple feed.

Fifth Embodiment

In a flowchart as depicted in FIG. 5 (the third embodiment), processing that is executed by using the transmission-type optical sensor 25 (processing at step S301, S317, or S319) may be executed by using the ultrasonic sensor 24 while processing that is executed by using the ultrasonic sensor 24 (processing at step S303, S307, S309, S315, S325, or S327) may be executed by using the transmission-type optical sensor 25. In such a case, the control unit 21 determines that the opening and closing cover 13 is closed and the transmission-type optical sensor 25 is broken, at step S311, and determines that the opening and closing cover 13 is closed and the ultrasonic sensor 24 is broken, at step S321.

Sixth Embodiment

In FIG. 1 and FIG. 2, the ultrasonic sensor 24 and the transmission-type optical sensor 25 may be interchanged and arranged. In such a case, in a flowchart as depicted in FIG. 6 (the fourth embodiment), preferably, processing that is executed by using the transmission-type optical sensor 25 (processing at step S407 or S427) is executed by using the ultrasonic sensor 24 while processing that is executed by using the ultrasonic sensor 24 (processing at step S415, S419, or S421) is executed by using the transmission-type optical sensor 25.

Seventh Embodiment

In the first to fourth embodiments, a case where the medium conveyance device 20 is applied to the scanner apparatus 1 that includes the medium reading units 17-1, 17-2 has been explained as an example. However, it is also possible to apply the medium conveyance device 20 to a printer apparatus that includes a print head instead of the medium reading units 17-1, 17-2. When the medium conveyance device 20 is applied to a printer apparatus, a reading target medium as described above is a medium that is a target of printing by such a printer apparatus (that is, a printing target medium). When the medium conveyance device 20 is applied to a printer apparatus, a standby state of the medium conveyance device 20 is, for example, a state after the printer apparatus is powered on and before the printer apparatus receives a print start instruction that is issued from an exterior of the printer apparatus. When the medium conveyance device 20 is applied to a printer apparatus, an operation start instruction is provided to the medium conveyance device 20, for example, when the printer apparatus is powered on and subsequently the printer apparatus receives a print start instruction that is issued from an exterior of the printer apparatus. Such a disclosed technique is applied to a printer apparatus so that it is possible to reduce a manufacturing cost for such a printer apparatus.

Eighth Embodiment

In the first embodiment, a case where the light transmitter 25T of the transmission-type optical sensor 25 is arranged in the opening and closing cover 13, the light receiver 25R of the transmission-type optical sensor 25 is arranged in the lower housing 12, and the light transmitter 25T and the light receiver 25R are arranged to face each other has been explained as an example. However, both the light transmitter 25T and the light receiver 25R may be arranged in one of the opening and closing cover 13 and the lower housing 12. When both the light transmitter 25T and the light receiver 25R are arranged in the opening and closing cover 13, a prism that folds a direction of light that is transmitted from the light transmitter 25T toward the light receiver 25R is preferably arranged in the lower housing 12 to face the light transmitter 25T and the light receiver 25R. When both the light transmitter 25T and the light receiver 25R are arranged in the lower housing 12, a prism is preferably arranged in the opening and closing cover 13 to face the light transmitter 25T and the light receiver 25R.

Ninth Embodiment

The medium conveyance device 20 may include, for example, a storage unit that stores the thresholds TH1, TH2, THA, THB, THC, and the like. A storage unit that is included in the medium conveyance device 20 is realized by, for example, a memory, as hardware. For an example of a memory, a Random Access Memory (RAM) such as a Synchronous Dynamic Random Access Memory (SDRAM), a Read Only Memory (ROM), a flash memory, or the like is provided.

The medium reading units 17-1, 17-2 are realized by, for example, Contact Image Sensor (CIS) type image sensors as hardware. The control unit 21 is realized by, for example, a processor as hardware. For an example of a processor, a Central Processing Unit (CPU), a Digital Signal Processor (DSP), a Field Programmable Gate Array (FPGA), or the like is provided. The control unit 21 may be realized by a Large Scale Integrated circuit (LSI) that includes a processor and a peripheral circuit. The control unit 21 may be realized by using a Graphics Processing Unit (GPU), an Application Specific Integrated Circuit (ASIC), or the like.

All or a part of each process in an explanation as described above in the control unit 21 may be realized by causing a processor that is included in the medium conveyance device 20 to execute a program that corresponds to such a process. For example, a program that corresponds to each process in an explanation as described above may be stored in a memory and the program may be read from the memory and executed by a processor. A program may be stored in a program server that is connected to the scanner apparatus 1 through an arbitrary network and loaded from such a program server into, and executed by, the scanner apparatus 1 or may be stored in a recording medium that is readable by the scanner apparatus 1, read from such a recording medium, and executed. A recording medium that is readable by the scanner apparatus 1 includes, for example, a portable storage medium such as a memory card, a USB memory, a SD card, a flexible disk, a magneto optical disk, a CD-ROM, a DVD, and a Blu-ray (registered trademark) disk. A program is a data processing method that is described in an arbitrary language or an arbitrary description method regardless of a format such as a source code or a binary code. A program is not necessarily limited to a singularly configured one and also includes a dispersedly configured one as a plurality of modules or a plurality of libraries or one that achieves such a function in cooperation with a separate program that is represented by an OS.

A specific configuration of dispersion or integration of the medium conveyance device 20 is not limited to a depicted one and it is possible to functionally or physically disperse or integrate all or a part of medium conveyance device 20 in an arbitrary unit depending on a variety of additions or the like or depending on a functional load, for configuration thereof.

According to an aspect of the disclosure, it is possible to reduce a manufacturing cost of a device.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medium conveyance device comprising:
   an openable and closable cover that covers a conveyance path for a medium;
   a sensor that includes a transmission unit which transmits a measured object and a reception unit which receives the measured object transmitted from the transmission unit, the sensor for detection of the medium being present on the conveyance path; and
   a processor that increases a transmission level of the transmission unit when a reception level for the measured object received by the reception unit is less than a threshold, and determines whether the cover is opened based on whether a rate of change of the reception level between before and after an increase in the transmission level is less than a threshold.

2. The medium conveyance device according to claim 1, wherein the processor determines that the cover is opened when the rate of change is less than the threshold, and determines that the medium is present on the conveyance path when the rate of change is greater than or equal to the threshold.

3. The medium conveyance device according to claim 1, comprising:
- a first sensor that includes a first transmission unit and a first reception unit, the first transmission unit transmitting a first measured object, and the first reception unit receiving the first measured object transmitted from the first transmission unit; and
- a second sensor that includes a second transmission unit and a second reception unit, the second transmission unit transmitting a second measured object, and the second reception unit receiving the second measured object transmitted from the second transmission unit, wherein
- the processor increases a second transmission level of the second transmission unit when a second reception level for the second measured object received by the second reception unit is less than a second threshold, and determines that the cover is opened when a first reception level for the first measured object received by the first reception unit is less than a first threshold and a rate of change of the second reception level between before and after an increase in the second transmission level is less than a third threshold.

4. The medium conveyance device according to claim 3, wherein a transmission-type optical sensor is used as the first sensor, and an ultrasonic sensor is used as the second sensor.

5. The medium conveyance device according to claim 3, wherein the processor, in a standby state of the medium conveyance device, determines that the second sensor is broken when the first reception level is greater than or equal to the first threshold and the rate of change is less than the third threshold, and determines that a jam of the medium occurs when the first reception level is greater than or equal to the first threshold and the rate of change is greater than or equal to the third threshold.

6. The medium conveyance device according to claim 3, wherein the processor, in a standby state of the medium conveyance device, determines that a jam of the medium occurs when the first reception level is less than the first threshold and the rate of change is greater than or equal to the third threshold.

7. The medium conveyance device according to claim 3, wherein the processor, after an operation start instruction is provided to the medium conveyance device, determines that a multiple feed of the medium occurs when the rate of change is greater than or equal to the third threshold.

8. A determination method in a medium conveyance device that includes an openable and closable cover that covers a conveyance path for a medium and a sensor that includes a transmission unit which transmits a measured object and a reception unit which receives the measured object transmitted from the transmission unit, the sensor for detection of the medium being present on the conveyance path, the determination method comprising:
- increasing a transmission level of the transmission unit when a reception level for the measured object received by the reception unit is less than a threshold, and
- determining whether the cover is opened based on whether a rate of change of the reception level between before and after an increase in the transmission level is less than a threshold.

* * * * *